United States Patent
Zhan et al.

(10) Patent No.: US 7,148,480 B2
(45) Date of Patent: Dec. 12, 2006

(54) POLYCRYSTALLINE OPTICAL WINDOW MATERIALS FROM NANOCERAMICS

(75) Inventors: Guodong Zhan, Davis, CA (US); Amiya K. Mukherjee, Davis, CA (US); Subhash H. Risbud, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 243 days.

(21) Appl. No.: 10/892,517

(22) Filed: Jul. 14, 2004

(65) Prior Publication Data

US 2006/0011839 A1 Jan. 19, 2006

(51) Int. Cl.
*G01J 5/00* (2006.01)
(52) U.S. Cl. .................. 250/338.1; 264/1.21; 264/434
(58) Field of Classification Search ............. 250/338.1, 250/339.14, 342; 264/1.21, 434, 435
See application file for complete search history.

(56) References Cited

U.S. PATENT DOCUMENTS

| | | | |
|---|---|---|---|
| 4,357,427 A * | 11/1982 | Ho et al. ................ | 501/153 |
| 4,717,822 A | 1/1988 | Byren | |
| 4,864,137 A | 9/1989 | Klein | |
| 5,119,232 A | 6/1992 | Daley et al. | |
| 5,366,178 A * | 11/1994 | Hsiong et al. ............ | 244/3.16 |
| 5,398,133 A | 3/1995 | Tsai et al. | |
| 5,488,371 A | 1/1996 | Targove | |
| 5,608,515 A | 3/1997 | Shu et al. | |
| 5,629,074 A | 5/1997 | Klocek et al. | |
| 5,643,505 A * | 7/1997 | Harris et al. ............ | 264/1.21 |
| 5,658,504 A * | 8/1997 | Shibata et al. .......... | 264/1.23 |
| 5,702,654 A * | 12/1997 | Chen et al. ............... | 264/82 |
| 5,712,724 A | 1/1998 | Klocek et al. | |
| 5,786,287 A * | 7/1998 | Bayya et al. ............. | 501/10 |
| 5,935,723 A | 8/1999 | Borden | |
| 6,144,031 A | 11/2000 | Herring et al. | |
| 6,287,478 B1 | 9/2001 | Klocek | |
| 6,592,798 B1 * | 7/2003 | Omori et al. ............. | 264/434 |
| 2003/0183991 A1 * | 10/2003 | Hideki et al. ............ | 264/681 |

FOREIGN PATENT DOCUMENTS

JP 2002326862 A * 11/2002

OTHER PUBLICATIONS

Wang, S. W, et al., Densification of Al2O3 Powder Using Spark Plasma Sintering, J. Mater. Res. 15(4): 982-987 (Apr. 2000).*
Apetz, Rolf et al.; "Transparent Alumina: A Light-Scattering Model"; 2003, *J. Am. Ceram. Soc.*, vol. 86, No. 3, pp. 480-486.
Krell, Andreas et al.; "Transparent Sintered Corundum with High Hardness and Strength"; 2003, *J. Am. Ceram. Soc.*, vol. 86, No. 1, pp. 12-18.

(Continued)

*Primary Examiner*—Albert Gagliardi
(74) *Attorney, Agent, or Firm*—M. Henry Heines; Townsend and Townsend and Crew LLP.

(57) ABSTRACT

Optical windows for protecting infrared sensing instruments are manufactured from nano-sized crystallites by compressing the crystallites into a continuous mass under high pressure in the presence of a pulsed electric current, preferably one produced by spark plasma sintering. The resulting materials have excellent optical and mechanical properties that make them favorable as replacements for the conventional single-crystal sapphire.

15 Claims, 1 Drawing Sheet

OTHER PUBLICATIONS

Krell, Andreas et al.; "Processing of High-Density Submicrometer Al₂O₃ for New Applications"; 2003, *J. Am. Ceram. Soc.*, vol. 86, No. 4, pp. 546-553.

Kuntz, Joshua D. et al.; "Properties and Microstructure of Alumina-Nioblum Nanocomposites made by novel Processing Methods"; 2002, *Proceedings of a symposium sponsored by the Shaping and Forming Committee of the Materials Processing and Manufactoring Division and the Mechanical Behavior Committee of the Structural Materials Division of TMS*, pp. 225-233.

Kuntz, Joshua D. et al.; "Nanocrystalline-Matrix Ceramic Composites for Improved Fracture Toughness"; 2004, *MRS Bulletin*, pp. 22-27.

Harris, Daniel C.; "Durable 3-5 um transmitting infrared window materials"; 1998, *Infrared Physics & Technoloby*, vol. 39, pp 185-201.

Harris, Daniel C.; "Materials for Infrared Windows and Domes"; 1999, *SPIE*, 9 pages.

Kim, B.N. et al.; "A high-strain-rate superplastic ceramic"; 2001, *Nature*, vol. 413, pp. 288-291.

Shimada, M. et al.; "Fabrication of transparent spinel polycrystalline materials"; 1996, *Materials Letters*, vol. 28, pp. 413-415.

Zhan, Guo-Dong et al.; "Single-wall carbon nanotubes as attractive toughening agents in alumina-based nanocomposites"; 2003, *Nature*, vol. 2, pp. 38-42.

* cited by examiner

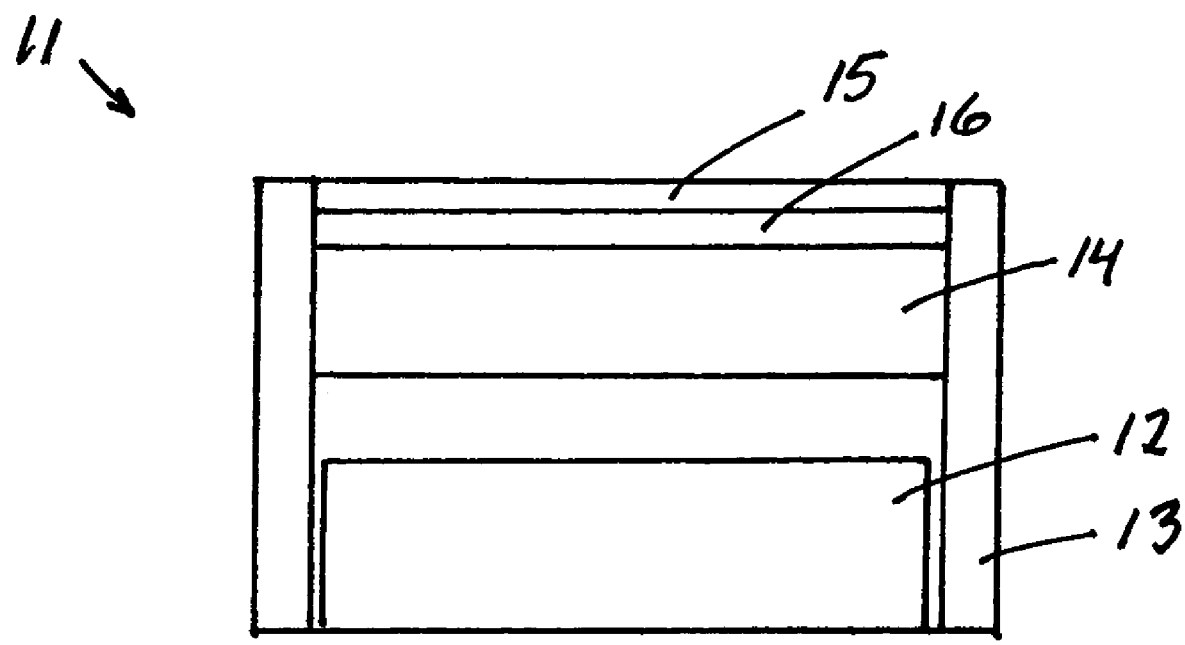

US 7,148,480 B2

POLYCRYSTALLINE OPTICAL WINDOW MATERIALS FROM NANOCERAMICS

STATEMENT AS TO RIGHTS TO INVENTIONS MADE UNDER FEDERALLY SPONSORED RESEARCH OR DEVELOPMENT

This invention was made with Government support by Grant No. G-DAAD19-00-1-0185, awarded by the United States Army Research Office. The Government has certain rights in this invention.

BACKGROUND OF THE INVENTION

1. Field of the Invention

This invention resides in the field of infrared-transparent materials, and also in methods and materials for improving the durability and transmissivity of structural materials.

2. Description of the Prior Art

Infrared sensors are used in various kinds of aircraft, both military and civilian, for a variety of reasons. Heat-seeking missiles, for example, use infrared sensors can guide themselves to a target aircraft by sensing the hot exhaust from the aircraft. Likewise, military targets on a battlefield can be observed with infrared sensors, and in general any object can be detected or its temperature measured by the infrared radiation emitted by the object.

Since infrared sensors are usually fragile in construction and susceptible to damage from external objects or harsh environments, the sensors are typically placed behind protective windows. Many of these windows are curved or dome-shaped, such as those protecting sensors that are placed in the noses of infrared-guided missiles and those protecting sensors that reside in a pod or turret mounted on the exterior of a helicopter. In both cases, the curved shape of the window reduces the aerodynamic drag on the aircraft. Curved or flat, however, the window must be highly transmissive of infrared radiation, highly resistant to external forces and conditions such as wind, rain, radiation, thermal shock, and chemical attack, and sufficiently strong to withstand aerodynamic forces and particle impacts. A material commonly used in infrared windows is sapphire, a form of aluminum oxide, which is favored because of its high transmissivity of infrared radiation and its high resistance to adverse environmental conditions. As greater demands are made on aircraft and weaponry, however, window materials that can withstand even higher heating rates, greater mechanical loads, and harsher environments are needed. Sapphire is also expensive and difficult to machine into precise curvatures or other shapes. Furthermore, when large windows are needed, the need for structural strength requires them to be of greater thickness, and the transmissivity of sapphire decreases with increasing thickness. Other materials, such as zinc sulfide (ZnS), zinc selenide (ZnSe), germanium (Ge), and gallium arsenide (GaAs), retain their transmittance as their thickness increases, but they lack the necessary resistance to external damage due to rain and particle impact.

One class of alternative materials that has been investigated for its low cost and high performance is polycrystalline materials. These materials have their limitations as well, however, notably a high degree of optical scatter and inferior mechanical strength. Optical scatter reduces the transmissivity of the material, and the inferior mechanical strength is generally accompanied by poor resistances to thermal shock, rain, and particle or projectile impacts.

All citations appearing in this specification, including published papers, patents and Internet websites, are hereby incorporated herein by reference in their entirety for all purposes legally capable of being served thereby.

SUMMARY OF THE INVENTION

It has now been discovered that optical windows with exceptional properties for protecting infrared sensors against harsh environments can be prepared by consolidating nano-sized ceramic crystallites under high pressure while exposing the crystallites to a pulsed electric current. The use of spark plasma sintering is a highly effective way of applying the pulsed electric current, and the consolidation is performed to achieve a high density product, preferably one that approaches full density, since the density enhances the transmissivity of the ultimate product. In the preferred practice of the invention, the sintering is followed by annealing to further improve the transmissivity of the consolidated crystallites, particularly when the material has a high density following the consolidation. For materials that are opaque after spark plasma sintering, annealing can render the materials transmissive of visible light. These processing steps result in a material that demonstrates the desired degree of infrared transmission as well as high mechanical properties including both fracture toughness and hardness. The invention permits the use of a wider variety of materials in the manufacture of effective wear-resistant optical windows than the optical windows of the prior art, and allows the manufacturer to utilize the favorable properties of materials not previously used for this purpose, thereby removing many of the limitations to which optical windows of the prior art were subject.

The invention thus resides in a method for preparing an optical window as well as the optical windows themselves and infrared sensor assemblies that contain the optical windows. Further objects, advantages, embodiments, and features of the invention will be apparent from the description that follows.

BRIEF DESCRIPTION OF THE DRAWING

The FIGURE is a representation of a sensor assembly incorporating features of the present invention.

DETAILED DESCRIPTION OF THE INVENTION AND PREFERRED EMBODIMENTS

The region of the electromagnetic spectrum known as infrared is the region between visible light and microwave, and in its broadest terms, includes wavelengths extending from about 0.75 micron to in excess of 300 microns and as high as 1,000 microns. The portions of this region that are of primary interest in the present invention are the near infrared (0.75–3 μm), the short infrared (3–6 μm), and the long infrared (6–15 μm). The short infrared and long infrared regions are of particular interest, and the wavelengths for which a particular infrared sensor is designed, or that are of interest in an infrared sensing application, may influence the choice of optimal starting materials and processing conditions in the practice of the invention. It is known, for example, in the art of optics and light scattering that the degree of scattering is negligible in media that have a feature size of less than one-twentieth the wavelength of interest. In the case of consolidated polycrystalline materials, the feature size is the width of the crystallites.

In this specification and the appended claims, the term "width," as it is used in reference to ceramic crystallites, denotes the largest linear dimension of the crystallites. The term is equivalent to the term "diameter" as commonly used in descriptions of particle size in many other and perhaps similar contexts, but is used herein for greater accuracy since the crystallites are not spherical. For cubic crystallites or crystallites in the form of rectangular solids, the term refers to the longest diagonal of the crystal.

Also in this specification and the appended claims, the term "polycrystalline" is used to denote a fused mass of discrete crystal grains as opposed to a single crystal with no discontinuities in the crystal lattice.

Also in this specification and the appended claims, the prefix "nano" and the various terms in which it is used, including "nano-sized," refer to a dimension that is substantially less than one micron. Preferred nano-sized particles are those that are approximately 100 nm or less in width, even more preferred are those that are approximately 60 nm or less in width, and most preferred are those whose width is within the range of about 5 nm to about 60 nm. As the examples in this specification demonstrate, the crystallites will typically increase in size during the processing steps of the invention, and accordingly, the reference to "nano-sized" crystallites refers to the starting materials prior to consolidation and exposure to the densifying and annealing conditions. The conditions are preferably controlled so that the grain size of the final product is about 350 nm or less, and more preferably about 300 nm or less.

A wide variety of known ceramic materials can serve as the starting crystallites. Metal oxide ceramics are preferred. Examples of metal oxide ceramics are alumina, yttria, zirconia, magnesium oxide, titania, cerium oxide, chromium oxide, hafnium oxide, and multimetallic oxides such as spinel. Preferred among these are alumina, yttria, zirconia, magnesium oxide, and spinel. Alumina, spinel, and combinations of alumna and spinel are even more preferred. Particularly favorable mechanical properties such as high strain rate and low-temperature superplasticity can be achieved by using composites of metal oxides, doped metal oxides, or both, i.e., composites of doped metal oxides or doped metal oxides and undoped metal oxides. Low-temperature superplasticity makes the product more readily formable to desired shapes, such as curved or dome-shaped optical windows. Forming can thus be performed more quickly and more easily with less risk of breakage and at less cost. Accordingly, a further preferred group of ceramics is alumina, spinel, magnesia-doped alumina, yttria-doped alumina, magnesia-doped and yttria-doped alumina, and a combination of spinel with alumina that is doped with magnesia, yttria, or both. Doping levels can vary widely, although best results will generally be achieved with a range of from about 30 ppm to about 1,000 ppm (by weight), and preferably from about 100 ppm to about 600 ppm.

When composites of two or more materials are used, the materials themselves can be selected in a manner that will optimize the qualities of the final product. The thermal properties of the product, for example, can be optimized by choosing components whose coefficients of thermal expansion are well matched or close to each other. Preferred components are those with minimal thermal expansion and maximal thermal conductivity. Alumina ($Al_2O_3$) and spinel ($MgAl_2O_4$), for example, are one of the preferred combinations since their coefficients of thermal expansion are within about 3% of each other, and both have high thermal conductivities. Optical properties as well can be optimized by selection of composite components with well-matched refractive indices. Using alumina and spinel again as an example, the refractive indices of these two materials differ from each other by only about 2.5%. In general, differences of about 10% or less, and preferably about 5% or less, in both thermal expansion coefficient and refractive index, will provide the best results.

When combinations of components are used, the crystallites are first mixed to achieve a uniform mixture. A preferred method of mixing is ball-milling in conventional rotary mills with the assistance of tumbling balls. The size of each ball, the number of balls used per unit volume of powder, the rotational speed of the mill, the temperature at which the milling is performed, and the length of time that milling is continued can all vary widely. Best results will generally be achieved with a milling time ranging from about 4 hours to about 50 hours. The degree of mixing may also be affected by the "charge ratio," which is the ratio of the mass of the balls to the mass of the powder. A charge ratio of from about 20 to about 100 will generally provide proper mixing.

Consolidation of the crystallites into a continuous mass is preferably performed by uniaxial compression. The consolidated crystallites will further benefit if they are densified to a high density during the consolidation. Optimal densities are those that approach full theoretical density, which is the maximum density that the material could achieve, and in the case of a composite, the volume average of the densities of each of the components of the composite. The term "relative density" is used herein to denote the actual density expressed as a percent of the theoretical density. Preferred products thus have relative densities of 90% or higher, more preferably 95% or higher, still more preferably 98% or higher, and most preferably 99% or higher.

Uniaxial compression is preferably performed in combination with electric field-assisted sintering, also known as "spark plasma sintering." One method of performing this type of sintering is by passing a pulsewise DC electric current through a dry compact of the crystallites while applying pressure. A description of electric field-assisted sintering and of the apparatus in which this process can be performed is presented by Wang, S. W., et al., *J. Mater. Res.* 15(4): 982–987 (April 2000). While the conditions may vary, best results will generally be obtained with a densification pressure exceeding 10 MPa, preferably from about 10 MPa to about 200 MPa, and most preferably from about 40 MPa to about 100 MPa. The preferred current is a pulsed DC electric current of from about 250 $A/cm^2$ to about 10,000 $A/cm^2$, most preferably from about 500 $A/cm^2$ to about 2,500 $A/cm^2$. The duration of the pulsed current will generally range from about 1 minute to about 30 minutes, and preferably from about 1.5 minutes to about 5 minutes. Preferred temperatures are within the range of from about 800° C. to about 1,500° C., and most preferably from about 900° C. to about 1,400° C. The compression and sintering are preferably performed under vacuum.

Refinement of the optical properties of the sintered ceramic body is achieved by annealing. Annealing can be performed by conventional methods used for the annealing of glass, ceramics and metals, and the degree of refinement can be selected by the choice of annealing temperature and the duration of time that annealing is allowed to continue. In most cases, effective results will be achieved at an annealing temperature of at least about 800° C. and an annealing time of about 10 hours or more. Preferably, annealing is performed at a temperature of about 950° C. or higher, and the length of time is preferably about 20 hours or more, and most preferably about 36 hours or more.

The optical window is formed either before or after annealing by conventional forming processes for optical windows of the prior art, notably high-precision machining. The window thickness may vary, depending on its configuration, size, and the stresses it is designed to withstand. In general, most optical windows in accordance with this invention will range in thickness from about 0.5 mm to about 10 mm.

The sintered and annealed ceramic windows of this invention can be supplemented with coatings to further enhance their properties and provide increased protection. An anti-reflective coating, for example, can be applied to minimize the reflection of infrared radiation and thereby cause more of the radiation to pass through the window. Examples of coating materials for this purpose are low refractive index materials, particularly yttria, silica, magnesium fluoride, calcium fluoride, zinc fluoride, zinc selenide, and hafnium oxide. Multiple antireflective coatings can also be used. In some applications, a coating that will transmit visible radiation in addition to the infrared radiation may be desired. Examples of coating materials for this purpose are leaded glass and zinc sulfide. Alternatively or in addition, coatings for scratch or erosion resistance can be applied, particularly for enhanced protection against rain, blowing sand, and particle impacts in general. Materials with a high damage threshold velocity such as gallium phosphide, sapphire, spinel, and aluminum oxynitride (ALON) can be used. For any of the coatings described in this paragraph, the thickness of the coating may vary, and the optimal thickness for any particular application may be an accommodation between the beneficial properties that the coating offers and such factors as the cost of the coating material, the cost of the coating process, and any reduction of the infrared transmissivity of the optical window that the coating may introduce. In most cases, an antireflective coating having a thickness of from about 0.5 micron to about 10 microns will provide effective and useful results, and a scratch resistance coating with a thickness of from about 1 micron to about 50 microns in thickness will be likewise appropriate.

Optical windows in accordance with this invention will be used as part of sensor assemblies for the detection of infrared radiation, in any of the applications and for any of the purposes cited above. Referring to the FIGURE, a contemplated sensor assembly 11 will include an infrared sensor 12 mounted within a housing 13, and the optical window 14 in the housing positioned to permit the passage of infrared radiation from outside the housing to the sensor 12. Coatings 15, 16 as described above are also shown. The housing 12 can be the body of an aircraft itself or a separate unit mounted to the surface of an aircraft or other vessel, instrument, or piece of equipment. The various configurations are well known to those skilled in the art.

The following examples are offered for purposes of illustration and are not intended to limit the scope of the invention.

EXAMPLES

These examples demonstrate the manufacture of optical windows in accordance with this invention under a range of processing conditions, and compare the properties of these window materials with published values of the corresponding properties of window materials of the prior art.

The test materials used in these examples were as follows (all particle sizes indicated below are weight-average sizes):

Alumina ($Al_2O_3$) of 99.99% purity, in the form of 80% $\alpha$-$Al_2O_3$ and 20% $\gamma$-$Al_2O_3$, by weight, the $\alpha$-$Al_2O_3$ particles as crystallites of 40 nm fused into particles of 300 nm, and the $\gamma$-$Al_2O_3$ particles as crystallites of 20 nm, obtained from Baikowski International Corporation (Charlotte, N.C., USA)

Alumina ($Al_2O_3$), same as above, except doped with 500 ppm MgO and 300 ppm $Y_2O_3$, also obtained from Baikowski International Corporation.

Cubic magnesia (MgO), 40 nm in size, obtained from Nanopowder Enterprises Inc., Piscataway, N.J., USA.

A composite powder of alumina (doped with yttria and magnesia) and spinel was prepared by forming a mixture containing 86.7% alumina and 13.3% magnesia (both by weight), suspending the combined powders in ethyl alcohol and mixing the suspension in a ball mill with zirconia milling balls for 24 hours. During the sintering described in the next paragraph, a solid reaction occurred between the magnesia and a portion of the alumina to form the spinel ($MgAl_2O_4$), the mixing process as a whole thereby producing a 50%/50% (volume basis) mixture of alumina ($Al_2O_3$) and spinel.

Sintering in accordance with the invention was then done on the composite powder under a range of processing conditions, and also on pure alumina. In each case, the powder or powder mixture was placed on a graphite die of inner diameter 19 mm and cold-pressed at 200 MPa. The cold-pressed powder mixture was then sintered on a Dr. Sinter 1050 Spark Plasma Sintering System (Sumitomo Coal Mining Company, Japan) under vacuum. Electric field-assisted (spark plasma) sintering was then performed at an applied pressure of 80–126 MPa with a pulsed current of about 5,000 A maximum and a maximum voltage of 10 V. The pulse duration time was about 12 ms and the interval between pulses was 2 ms. Once the pressure was applied, the samples were heated to 600° C. in 2 minutes and then heated further at rates of 550–600° C./minute to 1,050° C., 1,100° C., or 1,150° C., where they were held for 3–5 minutes. The temperature was monitored with an optical pyrometer focused on a depression in the graphite measuring 2 mm in diameter and 5 mm in depth. The sintered compacts prepared from the composite powder samples were then annealed at 1,000° C. for 48 hours.

The final densities of the sintered and annealed compacts were measured by the Archimedes method using deionized water as the immersion medium. Microstructural observations were made on an FEI XL30-SFEG high-resolution scanning electron microscope (SEM) with a resolution of higher than 2 nm. Grain sizes were estimated from high-resolution SEM of fracture surfaces. The phases were identified by X-ray diffraction using CuK$\alpha$ radiation. Indentation tests (hardness and fracture toughness measurements) were performed on a Wilson Tukon hardness tester with a diamond Vickers indenter. The indentation parameters for Vickers hardness and fracture toughness ($K_{IC}$) were a 2.5 Kg load and a dwell time of 15 sec. The fracture toughness was calculated by the Anstis equation as disclosed by Anstis, G. R., et al., "A critical evaluation of indentation techniques for measuring fracture toughness: I. Direct Crack Measurement," *J. Am. Chem. Soc.* 64(9): 533–538 (1981). Infrared spectra of the samples were collected on a FTIR instrument (Mattson Galaxy Series FTIR 3000). The spectrometer was set to collect 16 scans in transmittance mode with a resolution of 4 $cm^{-1}$ over a range from 650 to 16,000 nm. Thermal diffusivity measurements were performed by the use of a xenon flash thermal diffusivity system.

The various samples tested, the processing conditions, and the results are listed in the table below, together with values for the same physical parameters reported in the literature for optical window materials that have not been processed in accordance with the present invention.

TABLE

Processing Conditions and Test Results

A. Materials Processed in Accordance with the Present Invention:

| Material | Processing Conditions Temperature/Time SPS* | Anneal | Relative Density (%) | Final Average Grain Size (nm) | Fracture Toughness (MPa m$^{1/2}$) | Vickers Hardness (GPa) | Thermal conductivity (W/mK) |
|---|---|---|---|---|---|---|---|
| Pure Al$_2$O$_3$ | 1,150° C./ 3 min | — | 99.9 | 350 | 3.3 | 20 | 27 |
| 50% Al$_2$O$_3$ (Mg— and Y— doped) + 50% MgAl$_2$O$_4$ | 1,050° C./ 5 min | 1,000° C./ 48 h | 99.5 | 253 | — | — | — |
| 50% Al$_2$O$_3$ (Mg— and Y— doped) + 50% MgAl$_2$O$_4$ | 1,100° C./ 5 min | 1,000° C./ 48 h | 99.8 | 300 | 3.6 | 17 | — |
| 50% Al$_2$O$_3$ (Mg— and Y— doped) + 50% MgAl$_2$O$_4$ | 1,150° C./ 3 min | 1,000° C./ 48 h | 99.7 | 285 | — | — | — |

B. Literature Values for Materials Process in Accordance With the Prior Art:

| Material | Relative Density (%) | Average Grain Size (nm) | Fracture Toughness (MPa m$^{1/2}$) | Vickers Hardness (GPa) | Thermal conductivity (W/mK) |
|---|---|---|---|---|---|
| Sapphire | 100[a] | — | 2.5[a] | 14.7–21.6[a] | 42[a] |
| ALON | — | — | — | 19.1[a] | 12.6[a] |
| MgO | — | — | — | 6.8[a] | 59[a] |
| Y$_2$O$_3$ | — | — | — | 7.1[a] | 13.5[a] |
| Spinel | 99.8[a] | — | 2.8[b] | 13.7[a] | 14.8[a] |

*"SPS" denotes spark plasma sintering (electric field-assisted sintering)
Sources:
[a]Harris, Daniel D., Materials for Infrared Windows and Domes: Properties and Performance, SPIE Optical Engineering Press (Bellingham, Washington, 1999)
[b]Shimada, M., et al., "Fabrication of transparent spinel polycrystalline materials," Mater. Lett. 28: 413–15 (1996)

The microstructure of the pure alumina in the first row of data in Part A of the table consisted of equiaxed grains whose average size, as indicated in the table, was 350 nm. X-ray diffraction results confirmed that the composites in Part A of the table consisted of alumina and spinel, with no residual MgO phase. The table also indicates that the use of doped nanopowders resulted in a refinement of the grain size in the final product. The toughness and hardness of the composites (Part A of the table) exceeded those of both monolithic alumina (i.e., sapphire) and spinel (both as shown in Part B of the table).

It was further observed that the materials after spark plasma sintering were opaque, but upon annealing at 1,000° C. became translucent in the visible range. The transmittance of the pure alumina in Part A of the table after processing was more than 80% in the wavelength range of 2.6–6 µm, which is comparable to that of sapphire. In the wavelength range of 7–16 µm, the same alumina exhibited a transmittance of over 50%, as compared to sapphire and other oxides processed in accordance with the prior art which exhibit no transmittance in this range. The alumina-spinel composite processed in accordance with the invention exhibited over 40% transmittance in the wavelength range of 3–5 µm, with a maximum of 71% transmittance at 5 µm. (An absorption peak was observed at 4.3 µm but is thought to be the result of an impurity.) In the wavelength range of 6.5–16 µm, the composite exhibited 25% transmittance, as compared with window materials of the prior art that are nearly opaque in this region.

The foregoing is offered primarily for purposes of illustration and explanation. Further variations, modifications, and substitutions that, even though not disclosed herein, still fall within the scope of the invention may readily occur to those skilled in the art.

What is claimed is:

1. In an optical window comprising a layer of a material that is transmissive to infrared radiation, the improvement in which said material is a polycrystalline infrared transmissive material prepared by a process comprising consolidating particles which comprise nano-sized ceramic crystallites of 100 nm or less in width into a continuous mass by compressing said particles at a pressure of from about 10 MPa to about 200 MPa and a temperature of from about 800° C. to about 1,500° C. while passing a pulsed electric current of from about 250 A/cm$^2$ to about 10,000 A/cm$^2$ through said particles, and annealing said continuous mass to increase translucency of said continuous mass.

2. The improvement of claim 1 wherein said nano-sized ceramic crystallites are about 60 nm or less in width.

3. The improvement of claim 1 wherein said ceramic crystallites comprise a metal oxide selected from the group consisting of alumina, yttria, zirconia, magnesium oxide, spinel, titania, cerium oxide, chromium oxide, hafnium oxide, and combinations thereof.

4. The improvement of claim 1 wherein said ceramic crystallites comprise a metal oxide selected from the group consisting of alumina, yttria, zirconia, magnesium oxide, spinel, and combinations thereof.

5. The improvement of claim 1 wherein said ceramic crystallites comprise a metal oxide selected from the group consisting of alumina, spinel, and a combination of alumina and spinel.

6. The improvement of claim 1 wherein said ceramic crystallites comprise a metal oxide selected from the group consisting of alumina, spinel, magnesia-doped alumina, yttria-doped alumina, magnesia-doped and yttria-doped alumina, and a combination of (i) alumina doped with magnesia, yttria, or both, and (ii) spinel.

7. The improvement of claim 1 wherein said annealing is performed at a temperature of at least about 800° C. for at least about 10 hours.

8. The improvement of claim 1 wherein said annealing is performed at a temperature of at least about 950° C. for at least about 20 hours.

9. A sensor assembly for detection of infrared radiation, said sensor assembly comprising:
 a sensor housing;
 an infrared sensor mounted within said housing; and
 an optical window in said housing positioned to permit passage of infrared radiation from outside said housing to said infrared sensor, said optical window comprising a layer of a polycrystalline infrared transmissive material prepared by prepared by a process comprising consolidating particles which comprise nano-sized ceramic crystallites of 100 nm or less in width into a continuous mass by compressing said particles at a pressure of from about 10 MPa to about 200 MPa and a temperature of from about 800° C. to about 1,500° C. while passing a pulsed electric current of from about 250 A/cm$^2$ to about 10,000 A/cm$^2$ through said particles, and annealing said continuous mass to increase translucency of said continuous mass.

10. The sensor assembly of claim 9 wherein said nano-sized ceramic crystallites are about 60 nm or less in width.

11. The sensor assembly of claim 9 wherein said ceramic crystallites comprise a metal oxide selected from the group consisting of alumina, yttria, zirconia, magnesium oxide, spinel, titania, cerium oxide, chromium oxide, hafnium oxide, and combinations thereof.

12. The sensor assembly of claim 9 wherein said ceramic crystallites comprise a metal oxide selected from the group consisting of alumina, yttria, zirconia, magnesium oxide, spinel, and combinations thereof.

13. The sensor assembly of claim 9 wherein said ceramic crystallites comprise a metal oxide selected from the group consisting of alumina, spinel, magnesia-doped alumina, yttria-doped alumina, magnesia-doped and yttria-doped alumina, and a combination of (i) alumina doped with magnesia, yttria, or both, and (ii) spinel.

14. The sensor assembly of claim 9 wherein said consolidating comprises uniaxially compressing a compact of said particles at a pressure of from about 10 MPa to about 200 MPa and a temperature of from about 800° C. to about 1,500° C., and said pulsed electric current is from about 250 A/cm$^2$ to about 10,000 A/cm$^2$, and said process further comprises annealing said continuous mass at a temperature of at least about 800° C. for at least about 10 hours.

15. The sensor assembly of claim 9 wherein said nano-sized ceramic crystallites comprise a combination of (i) alumina doped with magnesia, yttria, or both, and (ii) spinel, said consolidating comprises uniaxially compressing a compact of said particles at a pressure of from about 10 MPa to about 200 MPa and a temperature of from about 800° C. to about 1,500° C., and said pulsed electric current is from about 250 A/cm$^2$ to about 10,000 A/cm$^2$, and said process further comprises annealing said continuous mass at a temperature of at least about 800° C. for at least about 10 hours.

* * * * *